(12) United States Patent
Zimmer et al.

(10) Patent No.: US 8,508,549 B2
(45) Date of Patent: *Aug. 13, 2013

(54) USER-INTERFACE DESIGN

(75) Inventors: Mark Zimmer, Aptus, CA (US); Peter Graffagnino, San Francisco, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,461

(22) Filed: Jan. 20, 2012

(65) Prior Publication Data

US 2012/0120076 A1    May 17, 2012

Related U.S. Application Data

(63) Continuation of application No. 10/876,298, filed on Jun. 24, 2004, now Pat. No. 8,068,103, and a continuation of application No. 11/696,619, filed on Apr. 4, 2007, now Pat. No. 8,130,224.

(51) Int. Cl.
  *G09G 5/00* (2006.01)
(52) U.S. Cl.
  USPC .......................................... 345/619; 715/762
(58) Field of Classification Search
  None
  See application file for complete search history.

(56) References Cited

U.S. PATENT DOCUMENTS

| | | | |
|---|---|---|---|
| 5,297,250 A | 3/1994 | Leroy et al. | |
| 5,357,603 A | 10/1994 | Parker | |
| 5,388,201 A | 2/1995 | Hourvitz et al. | |
| 5,471,572 A | 11/1995 | Buchner et al. | |
| 5,481,665 A | 1/1996 | Okada et al. | |
| 5,490,246 A | 2/1996 | Brotsky et al. | |
| 5,513,342 A | 4/1996 | Leong et al. | |
| 5,537,630 A | 7/1996 | Berry et al. | |
| 5,632,033 A | 5/1997 | Guillen et al. | |
| 5,651,107 A | 7/1997 | Frank et al. | |
| 5,721,848 A | 2/1998 | Joseph | |

(Continued)

FOREIGN PATENT DOCUMENTS

| | | |
|---|---|---|
| EP | 548586 | 6/1993 |
| EP | 0694879 | 1/1996 |

(Continued)

OTHER PUBLICATIONS

Akeley, et al. "Real-Time Graphics Architecture" http://www.graphics.stanford.edu/courses/cs448a-01-fall, The OpenGL ® Graphics System—CS448 Lecture 15, Fall 2001, pp. 1-20.

(Continued)

*Primary Examiner* — Ke Xiao
*Assistant Examiner* — Weiming He
(74) *Attorney, Agent, or Firm* — Wong, Cabello, Lutsch, Rutherford & Brucculeri LLP (57) ABSTRACT

Graphical user interface objects are specified by a collection of attribute-value pairs, the collection of which comprise a complete description of the object and may be used by a rendering element to create a visual representation of the object. In practice, each of a first portion of attributes may be associated with two or more values—each value (for a given attribute) specifying that attribute's value for a unique resolution. A second portion of attributes are associated with a single value and are, therefore, display resolution independent. Accordingly, the target object may be displayed at any of the specified design display resolutions or accurately displayed at any resolution between the specified design display resolutions.

20 Claims, 7 Drawing Sheets

(56) References Cited

U.S. PATENT DOCUMENTS

| | | | |
|---|---|---|---|
| 5,764,229 A | 6/1998 | Bennett | |
| 5,793,376 A | 8/1998 | Tanaka et al. | |
| 5,841,435 A | 11/1998 | Dauerer et al. | |
| 5,877,741 A | 3/1999 | Chee et al. | |
| 5,877,762 A | 3/1999 | Young | |
| 5,933,148 A | 8/1999 | Oka et al. | |
| 5,949,409 A | 9/1999 | Tanaka et al. | |
| 6,006,231 A | 12/1999 | Popa | |
| 6,031,937 A | 2/2000 | Graffagnino | |
| 6,075,543 A | 6/2000 | Akeley | |
| 6,166,748 A | 12/2000 | Van Hook et al. | |
| 6,211,890 B1 | 4/2001 | Ohba | |
| 6,246,418 B1 | 6/2001 | Oka | |
| 6,272,558 B1 | 8/2001 | Hui et al. | |
| 6,286,038 B1 | 9/2001 | Reichmeyer et al. | |
| 6,307,574 B1 | 10/2001 | Ashe et al. | |
| 6,313,851 B1 | 11/2001 | Matthews, III et al. | |
| 6,369,823 B2 | 4/2002 | Ohba | |
| 6,369,830 B1 | 4/2002 | Brunner | |
| RE37,722 E * | 5/2002 | Burnard et al. | 713/1 |
| 6,411,301 B1 | 6/2002 | Parikh et al. | |
| 6,421,058 B2 | 7/2002 | Parikh et al. | |
| 6,424,348 B2 | 7/2002 | Parikh | |
| 6,452,600 B1 | 9/2002 | Parikh et al. | |
| 6,456,290 B2 | 9/2002 | Parikh et al. | |
| 6,466,218 B2 | 10/2002 | Parikh et al. | |
| 6,483,524 B1 | 11/2002 | Petenkine et al. | |
| 6,489,963 B2 | 12/2002 | Parikh et al. | |
| 6,509,913 B2 | 1/2003 | Martin et al. | |
| 6,526,174 B1 | 2/2003 | Graffagnino | |
| 6,542,160 B1 | 4/2003 | Abgrall | |
| 6,571,328 B2 | 5/2003 | Liao et al. | |
| 6,577,317 B1 | 6/2003 | Duluk, Jr. et al. | |
| 6,580,430 B1 | 6/2003 | Hollis et al. | |
| 6,606,103 B1 | 8/2003 | Hamlet et al. | |
| 6,609,977 B1 | 8/2003 | Shimizu et al. | |
| 6,614,444 B1 | 9/2003 | Duluk, Jr. et al. | |
| 6,618,048 B1 | 9/2003 | Leather | |
| 6,636,214 B1 | 10/2003 | Leather et al. | |
| 6,639,595 B1 | 10/2003 | Drebin et al. | |
| 6,664,958 B1 | 12/2003 | Leather et al. | |
| 6,664,962 B1 | 12/2003 | Komsthoeft et al. | |
| 6,697,074 B2 | 2/2004 | Parikh et al. | |
| 6,707,462 B1 | 3/2004 | Peercy et al. | |
| 6,717,599 B1 | 4/2004 | Olano | |
| 6,734,864 B2 | 5/2004 | Abgrall | |
| 6,785,685 B2 | 8/2004 | Soetarman et al. | |
| 6,850,255 B2 | 2/2005 | Muschetto | |
| 6,906,720 B2 | 6/2005 | Emberling et al. | |
| 6,911,984 B2 | 6/2005 | Sabella | |
| 6,982,695 B1 | 1/2006 | Canova et al. | |
| 7,136,790 B1 | 11/2006 | Hobbs | |
| 7,167,173 B2 | 1/2007 | Balmelli et al. | |
| 7,234,111 B2 | 6/2007 | Chu et al. | |
| 7,340,716 B1 | 3/2008 | Chansler | |
| 7,590,947 B1 | 9/2009 | Gay et al. | |
| 7,675,529 B1 | 3/2010 | Brunner et al. | |
| 8,004,535 B2 | 8/2011 | Blaukopf et al. | |
| 2001/0024195 A1 | 9/2001 | Hayakawa | |
| 2001/0033295 A1 | 10/2001 | Phillips | |
| 2001/0050679 A1 * | 12/2001 | Shigeta | 345/204 |
| 2002/0067418 A1 | 6/2002 | I | |
| 2002/0091758 A1 | 7/2002 | Singh et al. | |
| 2002/0093516 A1 | 7/2002 | Brunner et al. | |
| 2002/0093538 A1 | 7/2002 | Carlin | |
| 2002/0118217 A1 | 8/2002 | Fujiki | |
| 2002/0140727 A1 | 10/2002 | Lindholm | |
| 2002/0147729 A1 | 10/2002 | Balfour | |
| 2002/0171682 A1 | 11/2002 | Frank et al. | |
| 2002/0174181 A1 | 11/2002 | Wei | |
| 2003/0058487 A1 | 3/2003 | Lay | |
| 2003/0067489 A1 | 4/2003 | Wong et al. | |
| 2003/0123739 A1 | 7/2003 | Graffagnino | |
| 2003/0126293 A1 | 7/2003 | Bushey | |
| 2003/0146934 A1 | 8/2003 | Bailey et al. | |
| 2003/0174136 A1 | 9/2003 | Emberling et al. | |
| 2003/0210268 A1 | 11/2003 | Kataoka et al. | |
| 2003/0234799 A1 | 12/2003 | Lee | |
| 2004/0032409 A1 | 2/2004 | Girard | |
| 2004/0054610 A1 | 3/2004 | Amstutz et al. | |
| 2004/0189670 A1 | 9/2004 | Govindan et al. | |
| 2004/0212610 A1 | 10/2004 | Hamlin | |
| 2004/0223003 A1 | 11/2004 | Heirich et al. | |
| 2004/0243940 A1 | 12/2004 | Lee et al. | |
| 2005/0010872 A1 | 1/2005 | Lee et al. | |
| 2005/0021970 A1 | 1/2005 | Reese et al. | |
| 2005/0041045 A1 * | 2/2005 | Plut | 345/660 |
| 2005/0081161 A1 | 4/2005 | MacInnes et al. | |
| 2005/0088447 A1 | 4/2005 | Hanggie et al. | |
| 2005/0094207 A1 | 5/2005 | Lo et al. | |
| 2005/0108656 A1 | 5/2005 | Wu et al. | |
| 2005/0140694 A1 | 6/2005 | Subramanian et al. | |
| 2005/0168471 A1 | 8/2005 | Paquette | |
| 2005/0187805 A1 | 8/2005 | English | |
| 2005/0190203 A1 * | 9/2005 | Gery et al. | 345/660 |
| 2005/0219255 A1 | 10/2005 | Lin et al. | |
| 2005/0229110 A1 | 10/2005 | Gegner et al. | |
| 2005/0231512 A1 | 10/2005 | Niles et al. | |
| 2005/0248545 A1 | 11/2005 | Nishimura et al. | |
| 2006/0055700 A1 | 3/2006 | Niles et al. | |
| 2006/0224627 A1 | 10/2006 | Manikutty et al. | |
| 2007/0263007 A1 | 11/2007 | Robotham et al. | |

FOREIGN PATENT DOCUMENTS

| | | |
|---|---|---|
| EP | 1383080 | 1/2004 |
| EP | 0972273 | 3/2004 |
| WO | 9845815 | 10/1998 |
| WO | 0209039 | 1/2002 |
| WO | 2004027707 | 4/2004 |

OTHER PUBLICATIONS

"Apple Human Interface Guidelines,"Apple Computer, Inc. Cupertino, CA Mar. 29, 2004. 317 pages.

Elliott, "Programming Graphics Processors Functionally." 2004.

Gelder, et al. "Direct Volume Rendering with Shading via Three Dimensional Textures" Computer Science Department, Univ. of California, Santa Cruz, CA 95064, 1996.

Haeberli, P. et al. "The Accumulation Buffer: Hardware Support for High-Quality Rendering" Computer Graphics, New York, NY, vol. 24, No. 4, Aug. 1, 1990, pp. 309-318.

nVIDIA, "Cg—Teaching Cg" Power Point Presentation, 2003, http://developer.nvidia.com/object/cg_tutorial_teaching.html.

Segal et al. "The OpenGL ® Graphics System: A Specification (Version 1.5)" Copyright © 1992-2003 Silicon Graphics, Inc. Oct. 30, 2003.

Shantzis, "A Model for Efficient and Flexible Image Computing" Computer Graphics Proceedings, Annual Conference Series, 1994, pp. 147-154.

Erikson, Carl "Polygonal Simplification: An Overview." TR96-016:Department of Computer Science CB # 3175, Sitterson Hall, UNC—Chapel Hill, Chapel Hill, NC. 1996m 32 pages.

International Search Report dated Jul. 27, 2005 (PCT/US05/008804).

International Search Report dated Aug. 8, 2005 (PCT/US05/008805).

* cited by examiner

USER-INTERFACE DESIGN

CROSS-REFERENCE TO A RELATED APPLICATION

This is a continuation application which claims priority to application Ser. No. 11/696,619, filed Apr. 4, 2007, which is a continuation of application Ser. No. 10/876,298, filed Jun. 24, 2004, now U.S. Pat. No. 8,068,103, all of which are hereby included in their entirety.

BACKGROUND

The invention relates generally to graphical user interface design and more particularly to a means for specifying a graphical user interface object in a procedural and largely display resolution independent manner.

Designing an efficient, ergonomic and aesthetically pleasing user interface is an integral stage of most application development projects. The graphical user interface ("GUI") is what the user sees and interacts with. Accordingly, the GUI must present information and choices to a user in a way that is not only pleasing and natural to the eye but conducive to efficient use of the underlying application. One major concern in the development of modern GUIs is the resolution of the various objects that comprise the GUI. Typically, a designer designs a graphical user interface object (e.g., a pushbutton, scrollbar, or slider) for a specified resolution. As the resolution of the user's display changes, however, display of the originally designed object may become distorted. This is particularly a problem when a graphical object is designed at a first resolution (e.g., 75 or 100 pixels per inch) and the user's display is at a second, higher resolution (e.g., 120 or 150 pixels per inch).

In the past, two general techniques have been used to address the problem associated with displaying objects designed for a first resolution but which are displayed at a second resolution. In the first, an original (low resolution) object is up-sampled to generate a larger image (e.g., through linear or bicubic interpolation). This technique results in blurry edges such that the user interface no longer looks crisp. In the second, an original object is designed for display at a high resolution and is then down-sampled to an unknown target resolution. While useful in some circumstances, it is not possible a priori to know what width to give a line (e.g., an object's edge) at the higher resolution such that when down-sampled it remains crisp. This is particularly true when there are multiple target resolutions. Thus, both up-sampling and down-sampling techniques tend to disturb the designer's specified line width. One of ordinary skill in the art will recognize that line width is a critical factor in GUI design as the width of lines define the edge of graphical objects. If edges appear blurry or ill-defined, the entire GUI design may be compromised.

Thus, it would be beneficial to provide a means to specify the design of a graphical user interface object independent of its display resolution. Such a description may advantageously be used by a rendering module to display the designed object at substantially any resolution.

SUMMARY

In one embodiment, the invention provides a method to represent a graphical user interface object in a procedural, and largely, resolution independent manner. The method includes receiving values for each of a plurality of attributes associated with a graphical user interface object (the attributes specifying display characteristics of the graphical user interface object), associating at least one value for each of the plurality of attributes, and storing the plurality of attributes and their associated values in a file. Each of a first portion of the object's attributes may be associated with a single value—a value that is independent of the object's display resolution. Each of a second portion of the object's attributes may be associated with two or more values—each value (for a given attribute) associated with a distinct display resolution. The collection of attribute-value pairs comprise a complete description of the graphical user interface object and may be used by a rendering module to create a visual representation of the object at any number of resolutions.

In another embodiment, the invention provides a method to render or display a graphical user interface object specified in a procedural manner as described above. The method includes receiving a graphical user interface object recipe file (a file containing attribute-value pairs), identifying the graphical user interface object described by the recipe file, extracting a plurality of values from the file (each value being associated with an attribute for the identified graphical user interface object), and rendering the identified graphical user interface object based on the extracted plurality of values.

Those of ordinary skill in the art will recognize that methods in accordance with the described invention may be embodied in programs, program modules or applications that may be stored in any media that is readable and executable by a computer system.

DETAILED DESCRIPTION

Methods, devices and systems to describe or capture the design of graphical user interface objects in a procedural and, largely resolution independent, manner are described. The following embodiments of the invention, described in terms of graphical user interface object design conforming to the Apple Human Interface Guidelines, are illustrative only and are not to be considered limiting in any respect. (The Apple Human Interface Guidelines are available from Apple Computer, Inc. of Cupertino, Calif.)

It has been determined that a graphical user interface object may be completely described by a collection of resolution-independent attributes. The collection of all attributes for a given object type define that type of object (e.g., pushbuttons). While the attributes used to define an object may vary, in whole or in part, from object-type to object-type, one of ordinary skill in the art will recognize those attributes needed to completely specify a given object. For example, while some attributes may be associated with a number of different graphical interface objects (e.g., those associated with an object's location in a display window), many attributes may change from object to object (e.g., buttons have attributes associated with the "button" metaphor while check-boxes and slider tracks have attributes particular to their visual metaphor). Accordingly, the attributes identified herein are illustrative only and should not be used to limit the claimed methods, devices and systems.

Just as a specific collection of attributes define a specific type of graphical interface object (e.g., pushbuttons), the values associated with each of the specific attributes define a particular implementation or embodiment of the object (e.g., a regular size, deactivated pushbutton). In accordance with the invention, some attribute-values are specified independent of the resolution at which the object is to be displayed while other attribute-values are specified for two or more resolutions. In general, those attributes associated with the physical location or geometry of an object may be associated with a plurality of values—one value for each specified resolution. Other attributes are associated with fixed, resolution independent, values (e.g., visual characteristics such as opacity, color and curvature). By way of example, consider a pushbutton object whose radius (attribute "buttonRadius") is specified for each of five predetermined resolutions (e.g., 100, 120, 125, 133.3 and 150 pixels per inch), but whose outline color (attributes "outlineRed", "outlineGreen", and "outlineBlue") and opacity (attribute "buttonOpacity") are fixed and resolution independent.

Thus, in accordance with the invention the collection of all attribute-values for a specified object completely define its visual characteristics and, as such, may be used to drive the graphical generation of the object (for example, by a rendering engine or operating system module responsible for rendering images). One benefit of object definitions in accordance with the invention is that graphical objects are defined in terms of a collection of resolution independent attributes. Another benefit of object definitions in accordance with the invention is that each attribute may be associated with a plurality of values, thereby permitting the designer to optimize the object's design for each of a specified number of resolutions. Still another benefit of object definitions in accordance with the invention is that if the actual displayed resolution of the graphical object is between two of the resolutions specified by the designer, the rendering engine may interpolate between the two values—a technique that generally provides a significantly improved display over prior art up-sampling or down-sampling techniques.

In accordance with the invention, a graphical user interface object's design is specified by a collection of attribute-value pairs that are retained or stored in a file, hereinafter referred to as a "recipe" file. In one embodiment, the recipe file may be a "flat" file consisting of sequential listing of attribute-value pairs. In another embodiment, the recipe file may be a hierarchically ordered file representing an inverted tree, where the root of the tree identifies the type of graphical object (e.g., a pushbutton, a check-box or a slider track) and the first level below the root identifies categories associated with the object (e.g., size, color and state). In one particular embodiment, hierarchically ordered recipe files are stored as eXtensible Markup Language ("XML") files. Attributes and their values are then associated with each node. In this way, every aspect of a graphical user interface object may be systematically identified and recorded in the recipe file in a manner that is wholly independent from the method used to physically draw (render) the image on a computer display device.

Methods, devices and systems in accordance with the invention may be described in terms of two phases. In a first phase, recipe files are generated. In a second phase the recipe files are used to generate visual representations of the graphical user interface object for one or more applications at substantially any resolution.

Figure 1:
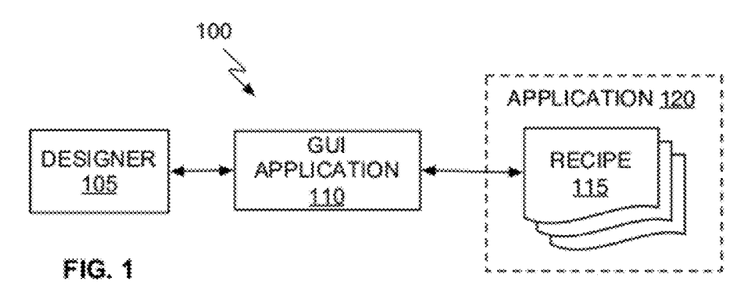
FIG. 1 shows, in block-diagram format, generation of recipe files in accordance with one embodiment of the invention.
Figure 2:
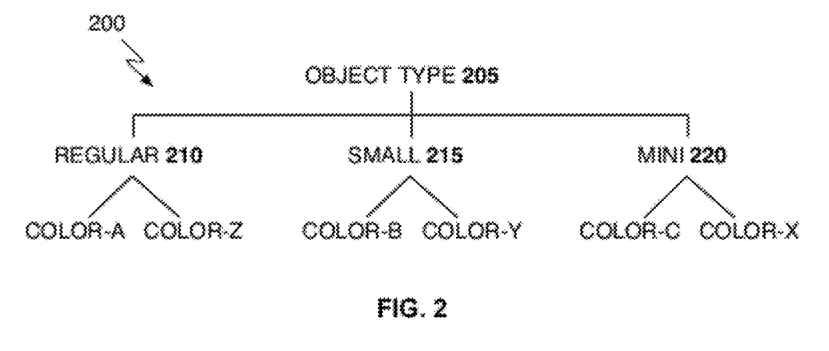
FIG. 2 shows a hierarchical structure for use in a recipe file in accordance with one embodiment of the invention.

Referring to FIG. 1, phase 1 100 is typically performed by designer 105 interacting with GUI design application 110 to generate one or more recipe files 115 for application 120. As noted above, recipe file(s) 115 may be organized in a hierarchical manner. FIG. 2 shows hierarchy 200 that has been found useful in the design of graphical user interface objects in accordance with the invention. As illustrated, root node 205 identifies the object type (e.g., pushbutton). Subordinate to root node 205 are nodes representing the relative size of the displayed object: Regular 210, Small 215 and Mini 220. It will be recognized that the sizes represented by nodes 210, 215 and 220 refer to the relative physical sizes of the displayed object and do not relate to the resolution at which such objects are displayed. Subordinate to the size nodes are "color" nodes, representing the fact that each (sub-) type of object may be associated with similar or separate and distinct color characteristics. Subordinate to the color nodes are states that each version of the object may assume, where a state is defined by the collection of attribute-value pairs associated with that (sub-) type of object. Thus, each node in the tree (root node 205 included) has a set of attribute-value pairs associated with it. In one embodiment, the root is fully populated—it always contains all attribute-value pairs needed to define the object. In this embodiment, each subordinate node only contains attribute-value pairs that serve to override the inherited attribute values of their parent node. For example, "Regular" node 210 may only possess size-based attributes (and their associated values), while Color-A node subordinate to node 210 may only serve to override the object's material map attribute-value (the main color of the object) and also perhaps the outline color attribute values.

Figure 3:
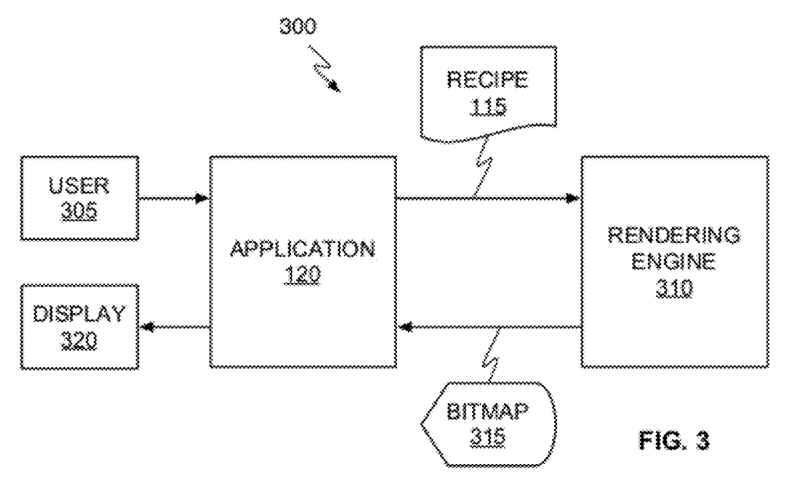
FIG. 3 shows, in block-diagram format, use of recipe files in accordance with one embodiment of the invention.

Referring to FIG. 3, phase 2 300 is typically performed when user 305 interacts with application 120 in such a manner as to require display of the graphical user object designed in accordance with phase 1 100. In one embodiment when this occurs, application 120 transmits recipe file 115 to rendering engine 310 which returns bitmap 315 which, ultimately, is presented to user 305 via display unit 320. In another embodiment, application 120 may extract the necessary information (in the form of attribute-value pairs) form recipe file 115 and transmit those to rendering engine 310. In still another embodiment, application 120 may indicate to rendering engine 310 where the recipe file(s) are located. One of ordinary skill will recognize that rendering engine 310 may be a stand-alone component or module directly accessible by applications or, alternatively, may be but one module of a larger graphical processing framework supported by the underlying operating system. One such modular or "framework" approach is described in the commonly owned and co-pending patent application entitled "System for Optimizing Graphics Operations" by John Harper, Ralph Brunner, Peter Graffagnino, and Mark Zimmer, Ser. No. 10/825,694, incorporated herein by reference in its entirety.

Figure 4:
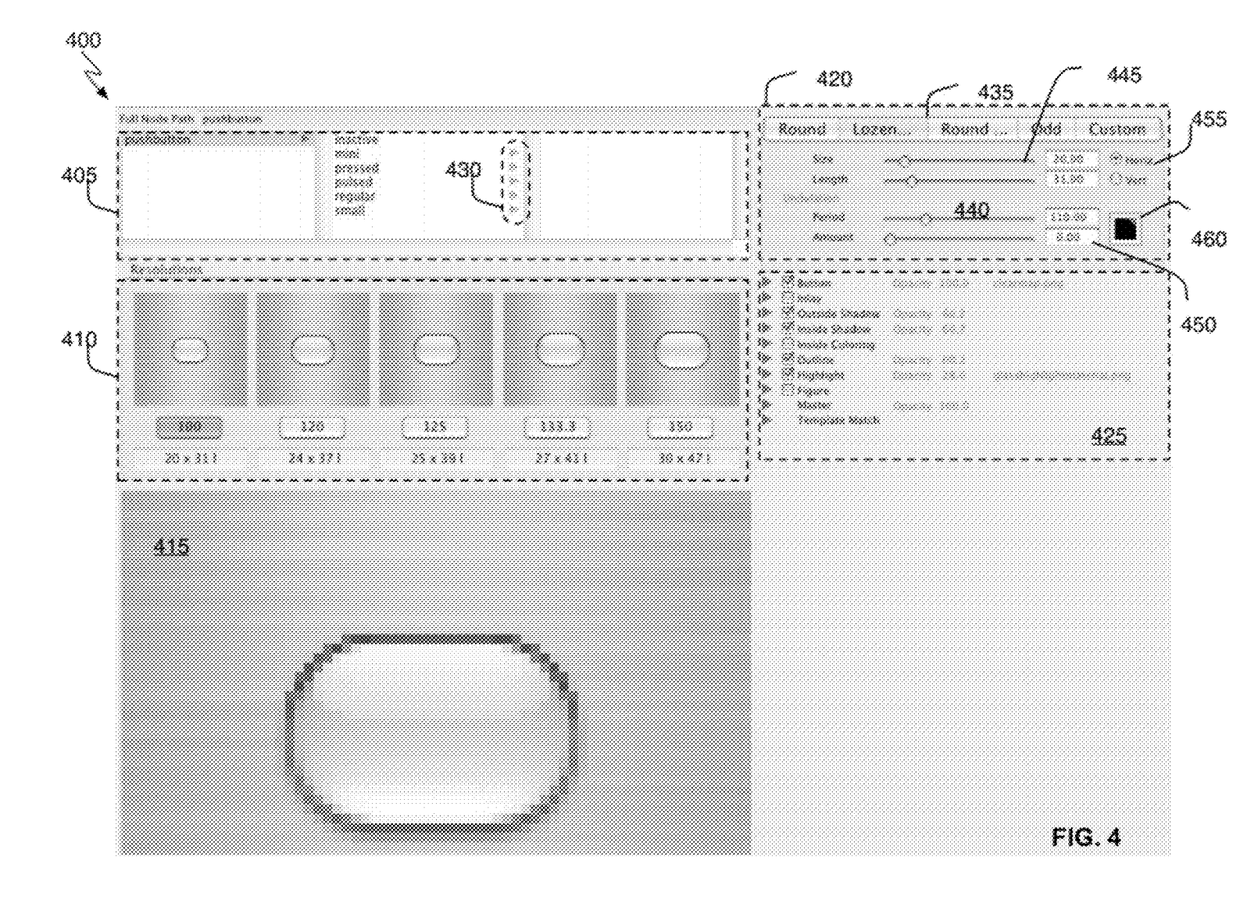
FIG. 4 shows a screen image of a graphical user interface object design application in accordance with one embodiment of the invention.
Figure 5A:
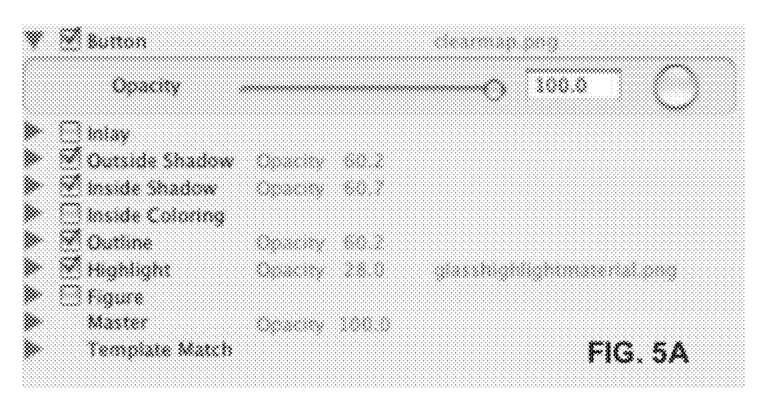
FIGS. 5A through 5J show screen images of various graphical object layer attributes and values in accordance with one embodiment of the invention.
Figure 5B:
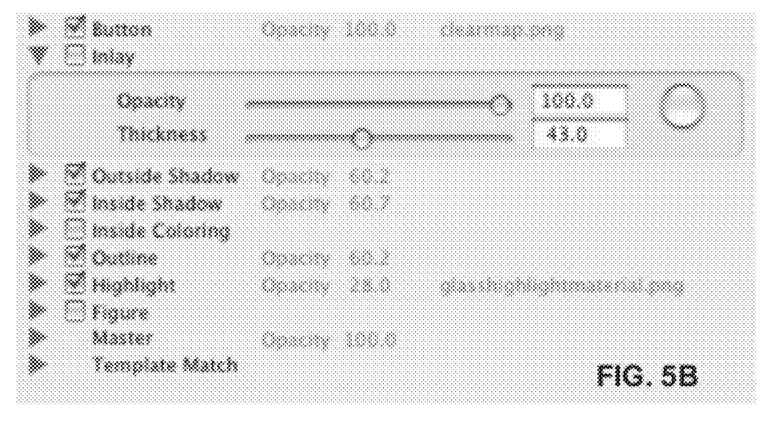
Figure 5C:
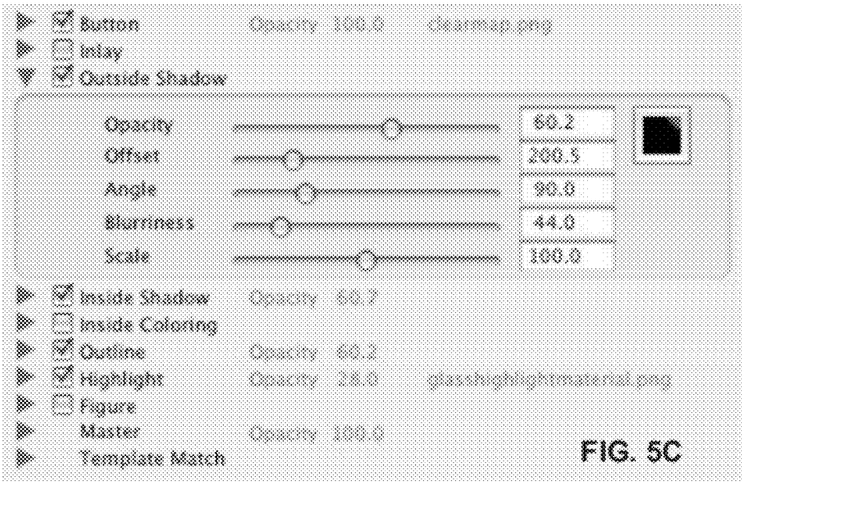
Figure 5D:
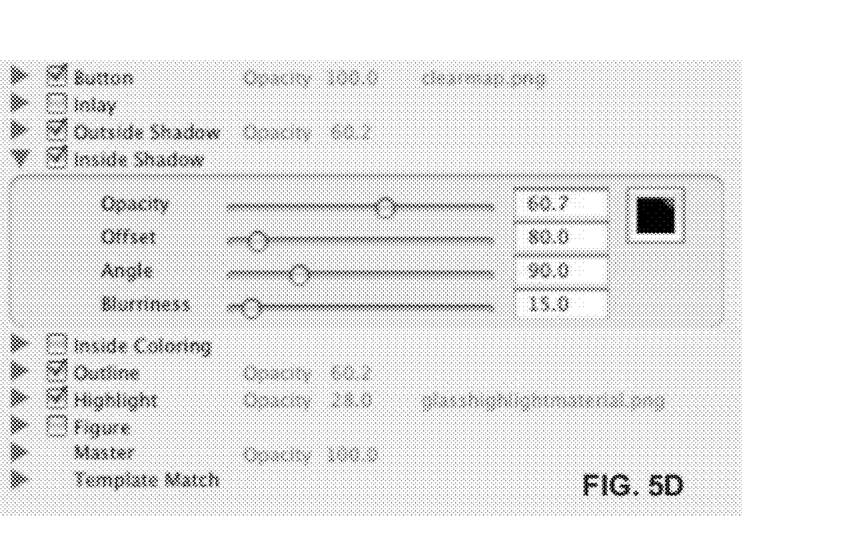
Figure 5E:
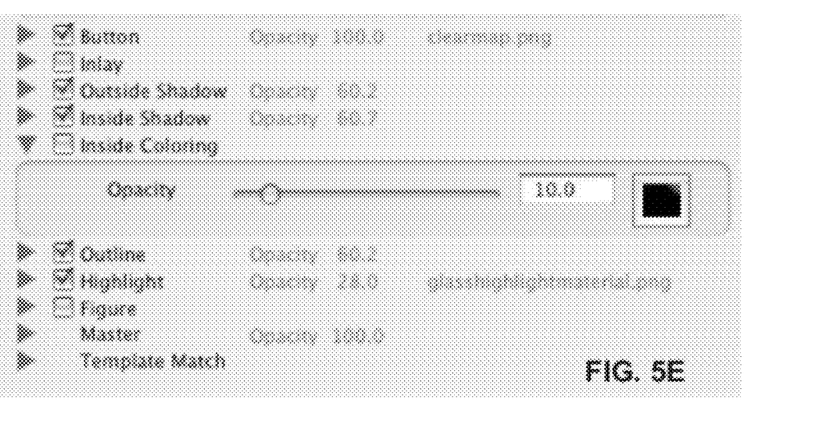
Figure 5F:
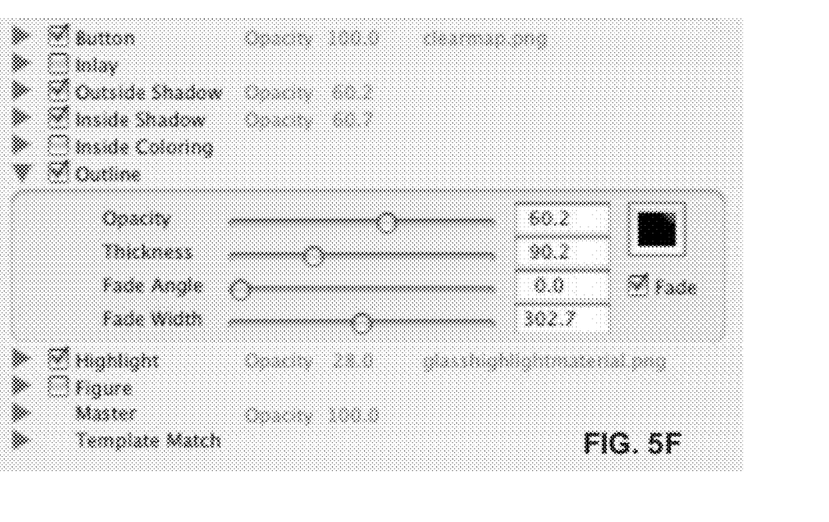
Figure 5G:
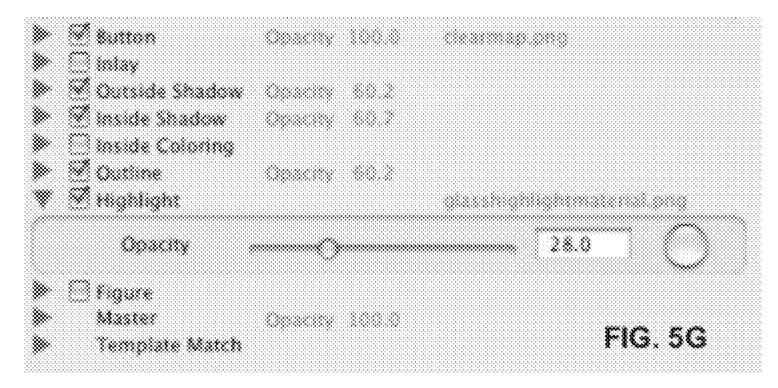
Figure 5H:
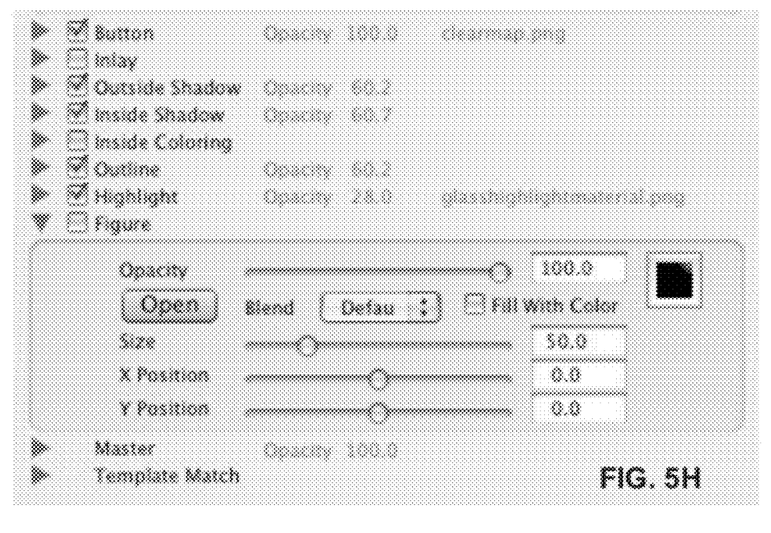
Figure 5I:
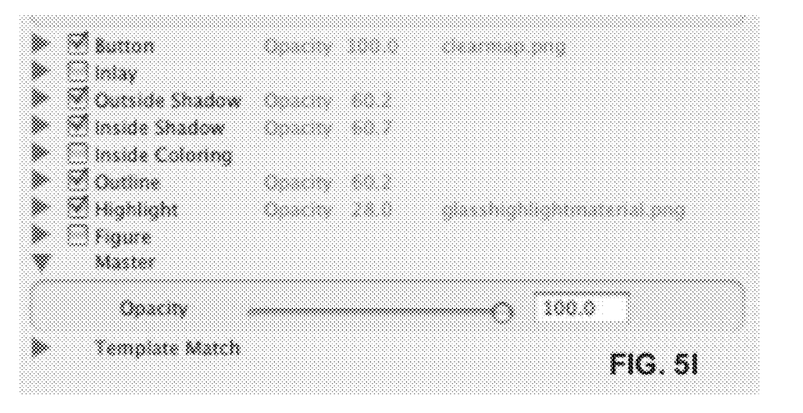
Figure 5J:
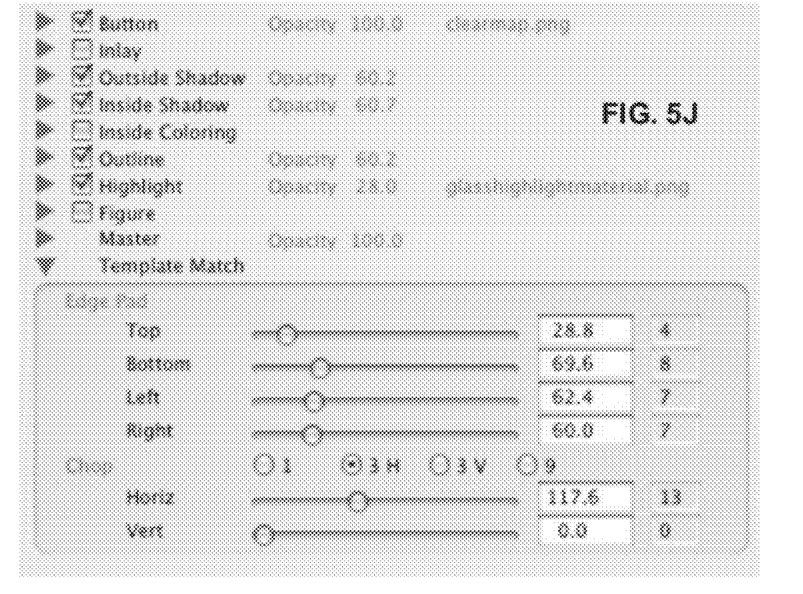

Referring to FIG. 4, in one embodiment a GUI designer may use interface object design application 400 to design, for example, a pushbutton object. Illustrative design application 400 includes browser region 405, resolution display region 410, expanded bit display region 415, object shape region 420 and user interface construction region 425.

Browser region 405 permits the selected display of various aspects of an object's design. In particular, region 405 provides a graphical representation of a recipe file's hierarchical structure in an Apple standard "Finder" format: the left-most pane identifies the recipe file's root (which, in turn, identifies the type of object—a pushbutton); the middle pane identifies categories of pushbuttons (e.g., inactive, mini, pressed, pulsed, regular and small). Subsequent panes display subcategories associated with a selected category. For example, disclosure triangles 430 indicate that pushbutton categories mini, pressed, pulsed, regular and small have additional aspects—the details of which are displayed in the right-most (and possibly subsequent) panes when one of these categories is selected.

Resolution display region 410 identifies one or more resolutions for which the object is being designed. As shown, the designer has specified that at least some attribute values for a pushbutton are specified for resolutions of 100, 120, 125, 133.3 and 150 pixels per inch. As noted above, not all attribute values are specified for each of these resolutions, only those that the designer determines are significant to the object's display. Illustrative attribute-value pairs for a pushbutton object and a scrollbar object, including those attributes having multiple values, are shown in Table 1 below. (It will be recognized that the objects shown in region 410 are not actually displayed at the indicated resolution, but are instead "simulations" of how the object would appear at those resolutions.)

Expanded bit display region 415 shows an expanded representation of the selected resolution image. In the illustrated example of FIG. 4, region 415 shows the 8× pixel-zoomed representation of the 100 pixel per inch pushbutton. Region 415 may be used, for example, to visually inspect the quality of the user interface object rendering or to compare the user interface object rendering with another pixel-zoomed rendering displayed in an image-editing application.

Object shape region 420 permits the designer to select, view and specify attribute values associated with a particular shape of the object being designed. For example, in the illustrated embodiment a pushbutton's shape may be any one of the shapes identified by shape buttons 435: Round, Lozenge ("Lozen ..."), Round Rectangle ("Round ..."), odd ("Scroll bar cap odd end") or custom. Immediately beneath shape buttons 435, area 440 shows specific attributes associated with the selected shape and, through controls such as slider 445, text box 450, radio button 455 or color well 460 permits the designer to change the value associated with those attributes.

User interface construction region 425 serves as the primary interface for viewing and specifying attribute values associated with an object's various visual characteristics or layers. In the embodiment of FIG. 4, for example, a pushbutton may be comprised of Button, Inlay, Outside Shadow, Inside Shadow, Inside Coloring, Outline, Highlight, Figure, Master and Template Match layers. Each layer may be individually selected (noted by a check box alongside the layer's title) and each layer's respective attributes (and means for setting their value) may be individually disclosed through activation of their disclosure triangles (the dark triangle to the immediate left of each layer title's check box), see FIGS. 5A through 5J.

Thus, in accordance with the invention a graphical user interface object may be completely defined by a collection of attribute-value pairs that may be used by a rendering engine (or similar module) to display the object. Further, one or more attributes may have two or more values, wherein each value is associated with a specific display resolution. This latter feature permits a designer to uniquely and specifically optimize a single design for multiple resolutions with the added benefit of providing sufficient information for interpolation (generally performed by the rendering engine) should the actual resolution be different from any of the specified resolutions.

By way of example only, Table 1 comprises a listing of attributes and their associated values for a pushbutton object and a scrollbar object.

TABLE 1

Illustrative Attribute-Value Pairs

| Attribute | Pushbutton Value | Scrollbar Value |
|---|---|---|
| buttonCenterX [1] | 48/100, 48/133.333, 47.5/150 | 48/100, 48.5/120, 48/125, 48.5/133.333, 48.5/150 |
| buttonCenterY [1] | 48/100, 48/120, 48.5/125, 48.5/133.333, 48/150 | 48/100, 48.5/120, 48/125, 48.5/133.333, 48.5/150 |
| buttonCurvature | 0.7071 | 0.7071 |
| buttonMaterial Angle [2] | 0 | 0 |
| buttonMaterial Blur [2] | 0 | 0 |
| buttonMaterial Bright [2] | 0 | 0 |
| buttonMaterial Choke [2] | 1 | 1 |
| buttonMaterial Contr [2] | 0 | 0 |
| buttonMaterial Edge [2] | 0 | 0 |
| buttonMaterial Flat [2] | 0 | 0 |
| buttonMaterial Name [2], [3] | clearmap | aquamaterial |
| buttonMaterial Pull [2] | 0 | 0 |
| buttonMaxX | 55 | 217 |
| buttonMaxY | 60 | 213 |
| buttonMinX | 23 | 185 |
| buttonMinY | 36 | 189 |
| buttonOffsetX | 0 | 0 |
| buttonOffsetY | 0 | 0 |
| buttonOpacity | 0.868217 | 1 |
| buttonPoint1X [1] | 43/100, 42/120, 41.5/125, 41.5/133.333, 40/150 | 189 |
| buttonPoint1Y [1] | 48/100, 48/120, 48.5/125, 48.5/133.333, 48/150 | 201 |
| buttonPoint2X [1] | 53/100, 54/120, 54.5/125, 54.5/133.333, 55/150 | 213 |
| buttonPoint2Y [1] | 48/100, 48/120, 48.5/125, 48.5/133.333, 48/150 | 201 |
| buttonRadius [1] | 10.5/100, 13/125, 14/133.333, 15.5/150 | 7.5/100, 9/120, 9.5/125, 11/150 |
| button Roundness | 0.5 | 0.5 |
| buttonType | 1 | 0 |
| figureBlend Mode | 0 | 0 |
| figureBlue | 0 | 0 |
| figureFill WithColor | 0 | 0 |
| figureGreen | 0 | 0 |
| figureName [3] | mixed | figure |
| figureOpacity | 1 | 1 |
| figureRed | 0 | 0 |
| figureSize | 0.5 | 0.5 |
| figureXPosition | 0 | 0 |
| figureYPosition | 0 | 0 |
| highlightMaterial Angle [2] | 0 | 0 |
| highlightMaterial Blur [2] | 41.509434 | 0 |
| highlightMaterial Bright [2] | −0.245283 | 0 |
| highlightMaterial Choke [2] | 0.532075 | 1 |
| highlightMaterial Contr [2] | 0.433962 | 0 |
| highlightMaterial Edge [2] | 0.481132 | 0 |
| highlightMaterial Flat [2] | −0.226415 | 0 |

TABLE 1-continued

Illustrative Attribute-Value Pairs

| Attribute | Pushbutton Value | Scrollbar Value |
|---|---|---|
| highlightMaterial Name [2] | glasshighlight material | highlight material |
| highlightMaterial Pull [2] | −0.057/100, −0.038/120, −0.075/125, −0.075/150 | 0 |
| highlightOpacity | 0.279683 | 1 |
| inlayMaterial Angle [2] | 0 | 0 |
| inlayMaterial Blur [2] | 0 | 0 |
| inlayMaterial Bright [2] | 0 | 0 |
| inlayMaterial Choke [2] | 1 | 1 |
| inlayMaterial Contr [2] | 0 | 0 |
| inlayMaterial Edge [2] | 0 | 0 |
| inlayMaterial Flat [2] | 0 | 0 |
| inlayMaterial Name [2], [3] | inlaymaterial | inlaymaterial |
| inlayMaterial Pull [2] | 0 | 0 |
| inlayMax Radius [1] | 12.757/100, 15.795/125, 17.01/133.333, 18.833/150 | 9.133/100, 10.935/120, 11.543/125, 13.365/150 |
| inlayOpacity | 1 | 1 |
| inlayThickness | 0.43 | 0.43 |
| insideColoring Blue | 0.386252 | 0 |
| insideColoring Green | 0.336153 | 0 |
| insideColoring Opacity | 0.1 | 0.1 |
| insideColoring Red | 0.705882 | 0 |
| insideShadow Blue | 0 | 0 |
| insideShadow BlurRadius [1] | 1.5/100, 1.857/125, 2/133.333, 2.214/150 | 1.072/100, 1.286/120, 1.358/125, 1.572/150 |
| insideShadow Green | 0 | 0 |
| insideShadow OffsetX | −0 | 0 |
| insideShadow OffsetY [1] | 0.75/100, 0.929/125, 1/133.333, 1.107/150 | 0.536/100, 0.643/120, 0.679/125, 0.786/150 |
| insideShadow Opacity | 0.60686 | 1 |
| insideShadow Red | 0 | 0 |
| masterOpacity | 0.744186 | 1 |
| oddDirection | 0 | 0 |
| outlineBlue | 0.968326 | 0 |
| outlineFade | 1 | 0 |
| outlineFade Angle | 0 | 0 |
| outlineFade Width [1] | 31.78/100, 39.346/125, 42.373/133.333, 46.913/150 | 1/100, 1.2/120, 1.267/125, 1.467/150 |
| outlineGreen | 0.176788 | 0 |
| outlineMax Radius [1] | 10.5/100, 13/125, 14/133.333, 15.5/150 | 7.5/100, 9/120, 9.5/125, 11/150 |
| outlineOpacity | 0.601583 | 0.4 |
| outlineRed | 0.242527 | 0 |
| outline Thickness[1] | 0.175/100, 0.144/120, 0.139/125, 0.129/133.333, 0.116/150 | 0.267/100, 0.222/120, 0.211/125, 0.2/133.333, 0.182/150 |
| outsideShadow Blue | 0 | 0 |
| outsideShadow BlurRadius | 0.66 | 1.07175 |
| outsideShadow Green | 0 | 0 |
| outsideShadow OffsetX | −0 | 0 |
| outsideShadow OffsetY | 1.503958 | 0 |
| outsideShadow Opacity | 0.601583 | 1 |
| outsideShadow Red | 0 | 0 |
| outsideShadow Scale | 1 | 1 |
| roundRect Horizontal | 1 | 1 |
| roundRect PointerDirection | 0 | 0 |
| roundRect PointerShape | 0 | 0 |
| roundRect Pointiness | 1.570796 | 1.570796 |
| showButton | 1 | 1 |
| showFigure | 1 | 0 |
| showHighlight | 1 | 1 |
| showInlay | 0 | 0 |
| showInside Coloring | 0 | 0 |
| showInside Shadow | 0 | 0 |
| showOutline | 0 | 0 |
| showOutline Shadow | 0 | 0 |
| templateMatch Bottom [1] | 7.308/100, 9.048/125, 9.744/133.333, 10.788/150 | 7.5/100, 9/120, 9.5/125, 11/150 |
| templateMatch Chop [1] | 1 | 0 |
| templateMatch Horiz [1] | 12.348/100, 15.288/125, 16.464/133.333, 18.228/150 | 7.5/100, 9/120, 9.5/125, 11/150 |
| templateMatch Left [1] | 6.552/100, 8.112/125, 8.736/133.333, 9.672/150 | 7.5/100, 9/120, 9.5/125, 11/150 |
| templateMatch Right [1] | 6.3/100, 7.8/125, 8.4/133.333, 9.3/150 | 7.5/100, 9/120, 9.5/125, 11/150 |
| templateMatch Top [1] | 3.024/100, 3.744/125, 4.032/133.333, 4.464/150 | 7.5/100, 9/120, 9.5/125, 11/150 |
| templateMatch Vert | 0 | 7.5/100, 9/120, 9.5/125, 11/150 |
| undulation Amount | 0 | 0 |
| undulationBlue | 0 | 0 |
| undulationGreen | 0 | 0 |
| undulation Period [1] | 22/100, 27/125, 28/133.333, 33/150 | 16 |
| undulationRed | 0 | 0 |

[1] The notation W/100, X/125, Y/133.333 and Z/150 indicates a value W should be used for a resolution of 100 pixels per inch, and so forth.
[2] Attributes whose values are set through material maps (i.e., button material map, highlight material map and inlay material map.
[3] Represents a file name. For example, an extension is added (e.g., ".png" for image files or ".pdf" for vector line art files).

In a current embodiment, graphical user interface objects identified in Table 2 may be defined/specified using the attributes (left-hand column) identified in Table 1. It will also be recognized that while many of the attributes above are specified by values in units of pixels, in other embodiments attribute values may be expressed in terms of a relative factor to a predetermined size factor.

TABLE 2

Illustrative Graphical Interface Objects

| | |
|---|---|
| Help Button (regular, small, mini) | Back Button (regular, small) |
| Round Button (regular, small) | Push Button (regular, small, mini) |
| Square Bevel Button (regular, small, mini) | Rounded Bevel Button (regular, small, mini) |
| Metal Button (regular, small, mini) | Segment Control (regular, small, mini) |
| Window Title Bar Controls (regular, small, mini) | Disclosure Button (regular, small, mini) |
| Arrow Pop-Up Button (regular, small, mini) | Pop-Up Button (regular, small, mini) |
| Combo Button (regular, small, mini) | Pulldown Button (regular, small, mini) |
| Check Box (regular, small, mini) | Radio Button (regular, small, mini) |
| Scroll Bar Track (regular, small) | Scroll Bar Thumb (regular, small) |
| Scroll Bar Caps (regular, small) | Slider Track (regular, small, mini) |
| Circular Slider Thumb (regular, small, mini) | Pointed Slider Thumb (north, east, south, west orientations) (regular, small, mini) |
| Rectangular Text Field (regular, small, mini) | Round Text Field (regular, small, mini) |
| Tabs (north, east, south, west orientations) | Determinate Progress Bar (regular, small) |
| Asynchronous Progress Indicator | iDisk Synch Progress Indicator |
| Pane Splitter | Drawer |
| List Box | Metal Window Shaping |

To create a graphical user interface object, the body color of the object (for each point on the object) and the anti-aliased visibility mask of the object are needed. The body color of an object may be obtained by using a three-dimensional representation of the object, or by creating a virtual representation of the object that defines the surface normal for each pixel on the object. Once a unit-length surface normal vector is computed at a point p, the x and y coordinate values of this vector may be used to compute the apparent color of the object at point p by looking up a color from the object's relevant material map. If the map is n pixels high and n pixels wide (this is done because a shaded sphere is inscribed in the map), one can address the material map at the two-dimensional location given by:

$$\left(\frac{(x+1)n}{2}, \frac{(y+1)n}{2}\right) \qquad \text{EQ. 1}$$

The color of the material map at this location may be used as the color for the object at point p. To get an accurate result, it is typical for a material map to be much larger (for example, 256×256 pixels or larger) than the graphical user interface object being rendered.

This same technique may be used in conjunction with a material map that possesses alpha (transparency) information. Once a color (with alpha) is looked up from a transparency material map, a highlight may be overlaid onto the object by using the alpha as a coverage fraction for the color from the map. Standard compositing methods may be used to accomplish this overlay operation.

An object's anti-aliased visibility mask may be obtained by computing a field that provides distance from the edge of the object. This field can be evaluated using a procedural description of the object. For example, a lozenge may be defined as the set of points at distance r or less from a finite non-zero-length line segment from point (p1x, p1y) to point (p2x, p2y). The distance d from the aforementioned line segment may be calculated at point (px, py) by a function such as that provided in Table 3 below.

TABLE 3

Illustrative Field (Distance) Calculation for a Lozenge Object

Let vx, vy, length, wx, wy, and d be floating point values, then

TABLE 3-continued

Illustrative Field (Distance) Calculation for a Lozenge Object $$vx = p1x - p2x$$
$$vy = p1y - p2y$$
$$length = \sqrt{(vx)^2 + (vy)^2}$$

$$vx = \frac{vx}{length}$$

$$vy = \frac{vy}{length}$$

$$wx = px - p1x$$
$$wy = py - p1y$$
$$d = |(wx \times vy) - (wy \times vx)|$$
determine distance from line if
$$((vx \times wx) + (vy \times wy)) > 0$$
that is, if past point p1
$$d = \sqrt{(wx)^2 + (wy)^2}$$
use distance from p1
$$wx = px - p2x$$
$$wy = py - p2y$$
if $((vx \times wy) - (vy \times wy)) < 0$
that is, if past point p2
$$d = \sqrt{(wx)^2 + (wy)^2}$$
use distance from p2

Given the distance function d defined above (see Table 1), an anti-aliased transparency value (mask) for the graphical user interface object may be computed as shown in Table 4. The same distance field may be used to construct the outline of the user interface object.

TABLE 4

Illustrative Transparency Value (Mask) Calculation mask = r-d
if (mask > 1.0)mask
= 1.0
if (mask < 0.0)
   mask = 0.0

Various changes or modifications in the foregoing description may be made without departing from the concept of the invention. For example, attributes other than, or in addition to, those identified in Table 1 may be used to specify an object. In addition, objects other than, or in addition to, those identified in Table 2 may be specified in accordance with the invention.

Further, hierarchical storage means other than an XML file may be used to store an object's procedural specification.

It will be recognized that methods to represent and render a graphical user interface object in accordance with this description may be performed by a programmable control device executing instructions organized into one or more program modules. A programmable control device may be a single computer processor, a special purpose processor (e.g., a digital signal processor, a graphics processing unit or a programmable graphics processing unit), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Accordingly, the preceding descriptions were presented to enable any person skilled in the art to make and use the invention as claimed and were provided in the context of the particular examples discussed above, variations of which will be readily apparent to those skilled in the art. Accordingly, the claims appended hereto are not intended to be limited by the disclosed embodiments, but are to be accorded their widest scope consistent with the principles and features disclosed herein.

What is claimed is:

1. A non-transitory computer readable storage medium comprising executable instructions stored thereon to cause a programmable control device to:
   receive a first plurality of values for an attribute of a graphical user interface object, wherein the attribute specifies a display characteristic of the graphical user interface object;
   associate a first of the first plurality of values with a first display resolution to create a first display resolution-value pair;
   associate the first display resolution-value pair with the attribute;
   associate a second of the first plurality of values with a second display resolution to create a second display resolution-value pair; and
   store the attribute and its associated first and second display resolution-value pairs, wherein the first value is used for the attribute when the attribute is displayed at the first display resolution and the second value is used for the attribute when the attribute is displayed at the second display resolution.

2. The computer readable storage medium of claim 1, further comprising executable instructions to cause the programmable control device to assign a default value to each of the first and second display resolutions of the attribute.

3. The computer readable storage medium of claim 1, further comprising executable instructions to cause the programmable control device to:
   provide the attribute and its associated first and second display resolution-value pairs to a rendering engine; and
   generate, by the rendering engine, a visual representation of the graphical user interface object based, at least in part, on at least one of the first and second display resolution-value pairs.

4. The computer readable storage medium of claim 3, wherein the executable instructions to cause the programmable control device to generate further comprise executable instructions to cause the programmable control device to generate a visual representation of the graphical user interface object at a display resolution between the first display resolution corresponding to the first value and the second display resolution corresponding to the second value.

5. The computer readable storage medium of claim 1, further comprising executable instructions to cause the programmable control device to associate a third one of the first plurality of values with a second attribute.

6. The computer readable storage medium of claim 5, wherein the executable instructions to cause the programmable control device to associate a third one of the first plurality of values with a second attribute comprise executable instructions to cause the programmable control device to associate a third one of the first plurality of values with an attribute that is independent of a display resolution for the graphical user interface object.

7. The computer readable storage medium of claim 1, wherein the executable instructions to cause the programmable control device to associate comprise executable instructions to cause the programmable control device to associate automatically at least one value from the first plurality of values with at least one display resolution for a second attribute.

8. The computer readable storage medium of claim 1, wherein the executable instructions to cause the programmable control device to store comprise executable instructions to cause the programmable control device to store the attribute and its associated first and second display resolution-value pairs in a hierarchically organized file.

9. The computer readable storage medium of claim 1, wherein the graphical user interface object is selected from the group consisting of a pushbutton, a bevel button, a metal button, a disclosure button, a pop-up button, a combo button, a pull-down button, a check box, a radio button, a segmented control, a window title bar, a scroll bar track, a scroll bar thumb, a scrollbar cap, a slider track, a slider thumb, a text field, a progress bar, a progress indicator, a list box, a drawer, and a pane splitter.

10. The computer readable storage medium of claim 1, further comprising executable instructions to cause the programmable control device to:
    receive a second plurality of values;
    associate values, from the second plurality of values, to display resolutions to create at least two display resolution-value pairs for each of one or more additional attributes; and
    store the one or more additional attributes and their associated at least two display resolution-value pairs.

11. The computer readable storage medium of claim 10, wherein the attribute and the one or more additional attributes are sufficiently complete to permit the graphical user interface object to be rendered.

12. A non-transitory computer readable storage medium comprising executable instructions stored thereon to cause a programmable control device to:
    receive a graphical user interface object recipe file;
    extract, from the recipe file, a plurality of display resolution-value pairs for an attribute of the graphical user interface object, wherein each value in a display resolution-value pair affects a display characteristic of the graphical user interface object when the graphical user interface object is displayed at the value's corresponding display resolution; and render the graphical user interface object based, at least in part, on the extracted plurality of display resolution-value pairs.

13. The computer readable storage medium of claim 12, wherein the executable instructions to cause a programmable control device to receive comprise executable instructions to cause a programmable control device to receive a hierarchically organized recipe file.

14. The computer readable storage medium of claim 12, wherein the executable instructions to cause a programmable control device to extract a plurality of display resolution-value pairs for an attribute further comprise executable instructions to cause a programmable control device to extract a single value for at least one additional attribute.

15. The computer readable storage medium of claim 12, wherein the executable instructions to cause a programmable control device to render comprise executable instructions to cause a programmable control device to render the graphical user interface object at a display resolution corresponding to a value of one of the plurality of display resolution-value pairs.

16. The computer readable storage medium of claim 12, wherein the executable instructions to cause a programmable control device to render comprise executable instructions to cause a programmable control device to render the graphical user interface object at a display resolution between a first value from a first of the plurality of display resolution-value pairs and a second value from a second of the plurality of display resolution-value pairs.

17. The computer readable storage medium of claim 16, wherein the executable instructions to cause a programmable control device to render comprise executable instructions to cause a programmable control device to render by linear interpolation between the first and second values.

18. The computer readable storage medium of claim 12, wherein the executable instructions to cause a programmable control device to render comprises an operating system level module.

19. A graphical user interface method, comprising:
receiving a plurality of values, at one of one or more processing devices, for an attribute of a graphical user interface object, wherein the attribute specifies a display characteristic of the graphical user interface object;
associating, using one of the one or more processing devices, a first of the plurality of values with a first display resolution to create a first display resolution-value pair;
associating, using one of the one or more processing devices, a second one of the plurality of values with a second display resolution to create a second display resolution-value pair; and
storing the attribute and its associated display resolution-value pairs, wherein the first value is used for the attribute when the attribute is displayed at the first display resolution and the second value is used for the attribute when the attribute is displayed at the second display resolution.

20. A graphical user interface object rendering method, comprising:
receiving, by one of one or more processing devices, a graphical user interface object recipe file;
extracting, using one of the one or more processing devices, a plurality of display resolution-value pairs for an attribute of the graphical user interface object from the recipe file, wherein each value in a display resolution-value pair affects a display characteristic of the graphical user interface object when the graphical user interface object is displayed at the value's corresponding display resolution; and
rendering, using one of the one or more processing devices, the graphical user interface object based, at least in part, on the extracted plurality of display resolution-value pairs.

\* \* \* \* \*